(12) United States Patent
Ryu et al.

(10) Patent No.: US 11,155,149 B2
(45) Date of Patent: Oct. 26, 2021

(54) BATTERY AND FUEL TANK ARRANGEMENT STRUCTURE OF HYBRID VEHICLE

(71) Applicants: Hyundai Motor Company, Seoul (KR); Kia Motors Corporation, Seoul (KR)

(72) Inventors: Buyeol Ryu, Hwaseong-Si (KR); Tae-koon Kim, Seoul (KR); Hyun Do Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 113 days.

(21) Appl. No.: 16/689,940

(22) Filed: Nov. 20, 2019

(65) Prior Publication Data

US 2021/0039488 A1 Feb. 11, 2021

(30) Foreign Application Priority Data

Aug. 8, 2019 (KR) .......................... 10-2019-0096477

(51) Int. Cl.
*B60K 15/063* (2006.01)
*B60K 1/04* (2019.01)
*B62D 25/20* (2006.01)
*B60K 6/28* (2007.10)

(52) U.S. Cl.
CPC .................. *B60K 1/04* (2013.01); *B60K 6/28* (2013.01); *B60K 15/063* (2013.01); *B62D 25/20* (2013.01); *B60K 2001/0433* (2013.01); *B60K 2015/0633* (2013.01)

(58) Field of Classification Search
CPC .... B60K 2001/0405; B60K 2001/0411; B60K 2001/0416; B60K 2001/0422; B60K 2001/0433; B60K 2001/0438; B60K 2015/0631; B60K 2015/0632; B60K 2015/0633; B60K 2015/0634; B60K 2015/0635; B60K 2015/0638; B60K 1/04; B60K 6/28
See application file for complete search history.

(56) References Cited

U.S. PATENT DOCUMENTS

| 7,004,274 | B2 | 2/2006 | Shibasawa et al. | |
| 7,614,473 | B2* | 11/2009 | Ono | B60L 58/21 |
| | | | | 180/299 |
| 7,654,351 | B2* | 2/2010 | Koike | B60L 50/66 |
| | | | | 180/68.5 |
| 7,688,582 | B2* | 3/2010 | Fukazu | B60L 50/66 |
| | | | | 361/690 |

(Continued)

FOREIGN PATENT DOCUMENTS

| CN | 103029757 B | 4/2015 |
| CN | 209426611 U | 9/2019 |

(Continued)

*Primary Examiner* — Jeffrey J Restifo
(74) *Attorney, Agent, or Firm* — Morgan, Lewis & Bockius LLP

(57) ABSTRACT

A battery is mounted in front of the vehicle along a longitudinal direction of the vehicle and mounted on the vehicle body, and the fuel tank is mounted in the vehicle body by disposing the fuel tank at the rear side in the longitudinal direction of the vehicle such that expansion of passenger compartment and vehicle body stability may be achieved.

11 Claims, 5 Drawing Sheets

(56) References Cited

U.S. PATENT DOCUMENTS

| | | | |
|---|---|---|---|
| 7,743,863 B2 * | 6/2010 | Shindou | B60L 53/80 |
| | | | 180/68.5 |
| 7,913,788 B1 | 3/2011 | Bryer et al. | |
| 8,393,426 B2 * | 3/2013 | Takahashi | B60K 1/04 |
| | | | 180/68.5 |
| 8,459,399 B2 * | 6/2013 | Ohashi | B60L 3/0053 |
| | | | 180/312 |
| 8,556,016 B2 * | 10/2013 | Yoda | B60K 6/28 |
| | | | 180/68.5 |
| 8,567,543 B2 * | 10/2013 | Kubota | B60K 6/40 |
| | | | 180/68.5 |
| 8,794,365 B2 | 8/2014 | Matsuzawa et al. | |
| 8,887,695 B2 * | 11/2014 | Aso | F02M 25/089 |
| | | | 123/519 |
| 8,978,617 B2 * | 3/2015 | Matsuda | B60K 1/04 |
| | | | 123/198 R |
| 9,259,998 B1 * | 2/2016 | Leanza | B62D 25/20 |
| 9,308,805 B2 * | 4/2016 | Shiromura | B60L 50/64 |
| 9,499,205 B1 * | 11/2016 | Elia | B60K 1/04 |
| 9,688,314 B2 * | 6/2017 | Ajisaka | B60K 15/073 |
| 9,932,072 B2 * | 4/2018 | Imura | B60K 13/04 |
| 9,944,173 B2 * | 4/2018 | Ajisaka | B62D 25/20 |
| 9,963,031 B2 | 5/2018 | Saeki | |
| 10,112,470 B2 * | 10/2018 | Hamilton | B62D 27/065 |
| 10,118,482 B2 * | 11/2018 | Muramatsu | B62D 25/2027 |
| 10,150,357 B2 * | 12/2018 | Landgraf | B60L 53/54 |
| 10,214,100 B2 * | 2/2019 | Ajisaka | B60K 15/04 |
| 10,245,955 B2 * | 4/2019 | Nakayama | B60L 50/64 |
| 10,252,636 B2 * | 4/2019 | Wada | B60L 50/15 |
| 10,259,309 B2 * | 4/2019 | Ajisaka | B60K 6/40 |
| 10,272,759 B2 * | 4/2019 | Sudhindra | B60L 50/66 |
| 10,300,788 B2 * | 5/2019 | Nishiumi | B60L 50/71 |
| 10,427,627 B2 * | 10/2019 | Fukazu | B60R 16/0215 |
| 10,468,645 B2 * | 11/2019 | Jackson | H01M 10/658 |
| 10,486,514 B2 * | 11/2019 | Takayanagi | H01M 8/04201 |
| 10,632,830 B2 * | 4/2020 | Sugizaki | B60K 6/26 |
| 10,668,821 B2 * | 6/2020 | Fukazu | B60K 15/063 |
| 10,682,907 B2 * | 6/2020 | Muramatsu | B60K 15/067 |
| 10,889,334 B2 * | 1/2021 | Tatsuwaki | B62D 25/2027 |
| 2010/0101881 A1 * | 4/2010 | Yoda | B60K 6/40 |
| | | | 180/68.5 |
| 2011/0278881 A1 * | 11/2011 | Asai | B60K 13/04 |
| | | | 296/193.07 |

FOREIGN PATENT DOCUMENTS

| | | |
|---|---|---|
| EP | 2 172 356 B1 | 5/2012 |
| EP | 2 447 099 B1 | 2/2014 |

* cited by examiner

BATTERY AND FUEL TANK ARRANGEMENT STRUCTURE OF HYBRID VEHICLE

CROSS-REFERENCE TO RELATED APPLICATION

The present application claims priority to Korean Patent Application No. 10-2019-0096477 filed on Aug. 8, 2019, the entire contents of which is incorporated herein for all purposes by this reference.

BACKGROUND OF THE INVENTION

Field of the Invention

The present invention relates to a battery and a fuel tank arrangement structure of a hybrid vehicle. More particularly, the present invention relates to a fuel tank arrangement structure of a hybrid vehicle in which a battery is mounted at a front along a longitudinal direction of the vehicle and a fuel tank is mounted at a rear side thereof.

Description of Related Art

In general, a hybrid vehicle such as a Plug in Hybrid Electric Vehicle (PHEV) and a Hybrid Electric Vehicle (HEV) is a vehicle that drives with a gasoline engine and an electric motor by mounting a separate electric motor in conjunction with the gasoline engine, and when driving with a gasoline engine under inefficient driving circumstances, efficiency of the entire system may be improved by charging the battery for the electric motor.

In the case of such a hybrid vehicle, when the engine power is not required, the vehicle is driven by use of only the electric motor after stopping the engine, not only improving vehicle quietness and fuel consumption, but also reducing harmful exhaust emissions.

In recent years, demand for hybrid vehicles that can reduce harmful exhaust emissions has been increasing due to demands such as tightening exhaust gas regulations and increasing fuel consumption.

In such a hybrid vehicle, the battery is normally mounted in the trunk, but the mounting position of the battery has been changed to improve the occupancy of the vehicle interior and to reduce the battery cost, and accordingly, there is a need to improve marketability and stability of the vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an arrangement structure of a battery and a fuel tank of a hybrid vehicle, which can improve steering stability of the vehicle, reduce costs by reducing the weight and length of related cables with the front layout of the battery, and improve dwelling ability by expanding the indoor space.

An arrangement structure of a battery and a fuel tank of a hybrid vehicle, in which a battery is mounted at a front side of the vehicle along a longitudinal direction of the vehicle and thus may be mounted on a vehicle body, and a fuel tank is mounted at a rear side of the vehicle in the longitudinal direction of the vehicle and thus may be mounted on the vehicle body.

A battery mounting portion and a fuel tank mounting portion that are protrudingly formed in a height direction of the vehicle to form first and second receiving spaces may be respectively provided in a floor panel of the vehicle body, the battery may be received in the receiving space of the battery mounting portion and thus mounted thereon, and the fuel tank may be received in the receiving space of the fuel tank mounting portion and thus mounted thereon.

The battery may be mounted below a front seat of the vehicle at the front side along a longitudinal direction of the vehicle, and the fuel tank may be mounted below a rear seat of the vehicle.

Left and right side members that extend in the longitudinal direction of the vehicle may be coupled to left and right sides of the floor panel in a width direction of the vehicle, and the battery and the fuel tank may be mounted in a space formed between the left and right side members.

A tunnel portion that protrudes upward in a height direction of the vehicle may be formed in the floor panel, and the battery and the fuel tank may be mounted to be horizontally symmetrically about the tunnel portion.

First extensions that extend toward the outside of the vehicle in the width direction of the vehicle may be provided in the left and right side members, second extensions that extend along the width direction of the vehicle may be provided in the left and right side members at a side which is rear than the first extension portion in the longitudinal direction of the vehicle, and the battery may be mounted in a space formed between the first extensions and the second extensions and thus mounted on the floor panel through first and second mounting members.

The first extensions and the second extensions may form a box-shaped closed end surface together with the floor panel.

A front seat of the vehicle may be engaged to the floor panel through a seat mounting member, and. The seat mounting member, the first mounting member, and the second mounting member may be parallel with each other in the width direction of the vehicle, and may be overlapped with each other in the height direction of the vehicle.

An auxiliary muffler mounted in a middle portion of an exhaust line of an engine extending in the longitudinal direction of the vehicle may be mounted between the first extensions and the second extensions.

The fuel tank mounting portion may extend in the width direction of the vehicle to connect the left and right side members, and may be formed in a space formed between two connection members spaced from each other in the longitudinal direction of the vehicle.

The floor panel may rise in the height direction of the vehicle to form a partition in front of the fuel tank mounting portion, and a fuel tank may be mounted behind the partition.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
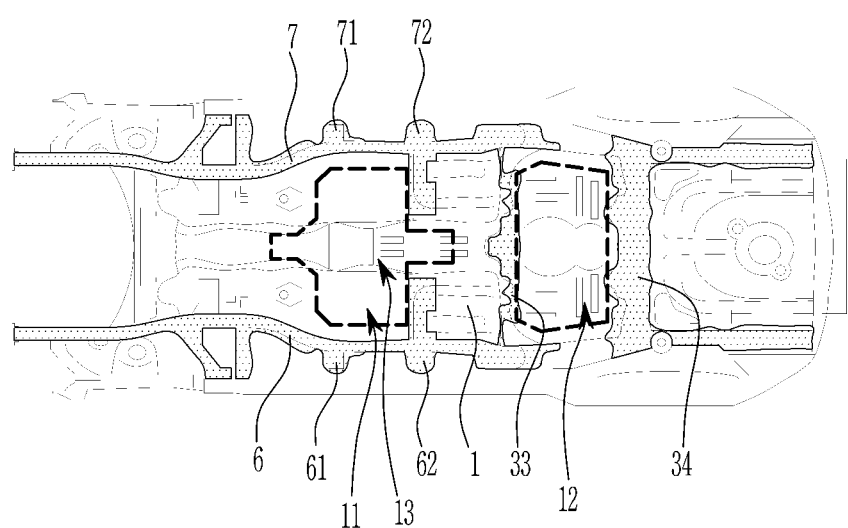
FIG. 1 is a bottom view of a vehicle body before a battery and a fuel tank are mounted on a vehicle body of a hybrid vehicle according to an exemplary embodiment of the present invention.
Figure 2:
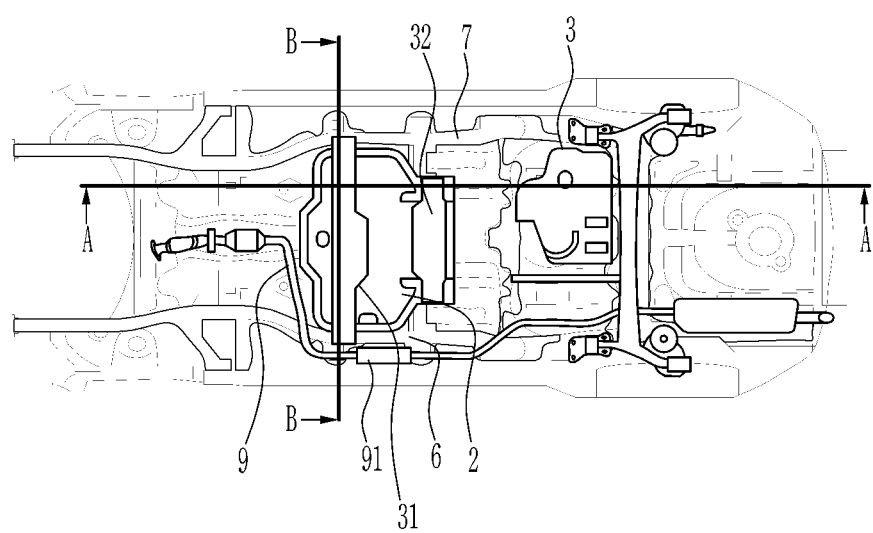
FIG. 2 is a bottom view of a vehicle body in a state that the battery and the fuel tank are mounted on the vehicle body of the hybrid vehicle according to the exemplary embodiment of the present invention.
Figure 3:
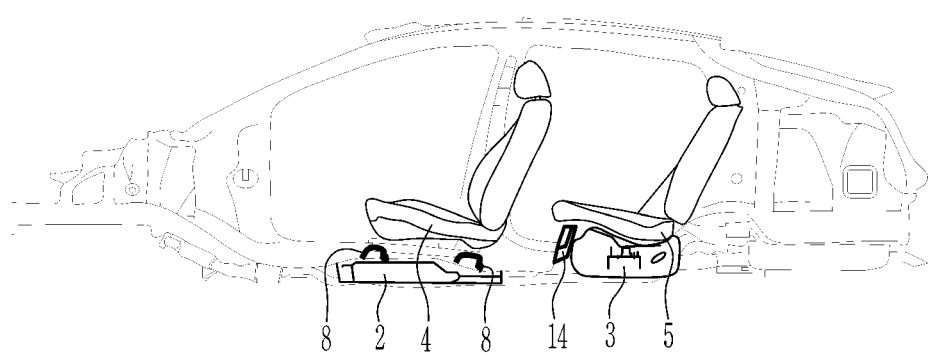
FIG. 3 is cross-sectional view of FIG. 2, taken along the line A-A.
Figure 4:
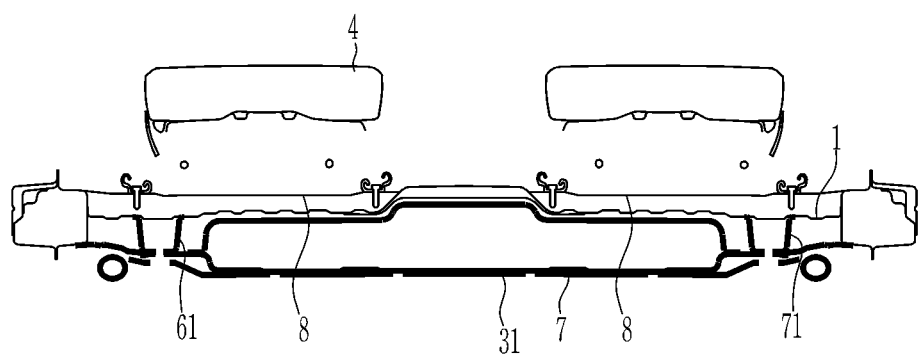
FIG. 4 is a cross-sectional view of FIG. 2, taken along the line B-B.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other h, and the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Since the size and the thickness of each configuration shown in the drawings are arbitrarily indicated for better understanding and ease of description, the present invention is not limited to shown drawings, and the thickness of layers, films, panels, regions, etc., are exaggerated for clarity.

Furthermore, unless explicitly described to the contrary, the word "comprise" and variations such as "comprises" or "comprising" will be understood to imply the inclusion of stated elements but not the exclusion of any other elements.

Referring to FIG. 1, FIG. 2, FIG. 3, and FIG. 4, in an arrangement structure of a battery and a fuel tank in a hybrid vehicle according to an exemplary embodiment of the present invention, a battery 2 and a fuel tank 3 are mounted to a bottom side of a floor panel 1 that forms a vehicle body. The bottom side of the floor panel 1 faces the ground.

That is, a battery mounting portion 11 is provided in the front in the longitudinal direction of the vehicle of the floor panel 1 and a fuel tank mounting portion 12 is provided in the rear, the floor panel 1 forming the battery mounting portion 11 and the fuel tank mounting portion 12 are protruded in the height direction of the vehicle to form a receiving space, and the battery mounting portion 11 accommodates the battery 2 and thus the battery 2 may be mounted on the floor panel 1 and the fuel tank mounting portion 12 accommodates the fuel tank 3 and thus the fuel tank 3 may be mounted on the floor panel 1.

When the battery 2 and the fuel tank 3 are mounted on the bottom portion of the floor panel 1, facing the ground as described above, the weight of the battery 2 and the fuel tank 3 may lower the center of gravity of the vehicle, improving driving and adjusting stability of the vehicle.

The battery 2 may be mounted in the front in the longitudinal direction of the vehicle, and the fuel tank 3 may be mounted in the rear. The battery 2 may be mounted under a front seat of the vehicle 4 at the front side in the longitudinal direction of the vehicle, and the fuel tank 3 may be mounted under a rear seat of the vehicle 5.

As described above, when battery 2 is mounted in front, the length and weight of a connection cable of various electric devices and electronic devices using the battery 2 as a driving source may be reduced, reducing the cost and enhancing the fuel consumption efficiency.

Furthermore, the floor panel of the battery 2 does not penetrate an indoor living space of the vehicle, improving habitability and marketability of the vehicle.

Side members 6 and 7 extending in the longitudinal direction of the vehicle may be coupled to the left and right sides along a width direction of the vehicle of the floor panel 1, and the battery 2 and the fuel tank 3 are located in a space formed between the two side members 6 and 7.

Accordingly, the battery 2 and the fuel tank 3 are mounted in the space formed between the rigid left and right side members 6 and 7 which increase the rigidity of the vehicle body, and the battery 2 and the fuel tank 3 may be protected from external shock, improving the collision stability of the battery 2 and the fuel tank 3.

In the floor panel 1, a tunnel portion 13 protruding upward along the height direction of the vehicle may be formed, and the battery 2 and the fuel tank 3 may be mounted horizontally symmetrically about the tunnel portion 13. Accordingly, the balance of the vehicle may be improved by the heavy battery 2 and fuel tank 3, which improves the steering and driving stability of the vehicle.

The side members 6 and 7 are provided with first extensions 61 and 71 extending outward in the width direction of the vehicle, and the side members 6 and 7 may be provided with second extensions 62 and 72 extending outward and inward in the width direction of the vehicle at the rear side in the longitudinal direction of the vehicle.

The battery 2 is mounted in space formed between the first extensions 61 and 71 and the second extensions 62 and 72 such that the battery 2 may be mounted on the floor panel 1 through two mounting members, i.e., first and second mounting members 31 and 32.

That is, the battery 2 is inserted into a space formed between the side members 6 and 7, and the first and second mounting members 31 and 32 are overlapped over the battery 2 and thus may be respectively engaged to the first extensions 61 and 71 and the second extensions 62 and 72.

The first extensions 61 and 71 and the second extensions 62 and 72 form a box-shaped closed end surface, increasing rigidity.

The front seat 4 may be engaged to the floor panel 1 through two seat mounting members 8.

The seat mounting members 8, the first mounting member 31, and the second mounting member 32 are parallel with each other along the width direction of the vehicle, and are mounted to be overlapped in the height direction of the vehicle, increasing rigidity of the battery mounting portion.

As described above, since the first and second mounting members 31 and 32 are extended in the width direction of the vehicle and then engaged to mount the battery 2 on the first extensions 61 and 71 and the second extensions 62 and 72 of the side members 6 and 7 extended in the longitudinal direction of the vehicle, the two side members 6 and 7 are connected to each other through the first and second mounting members 31 and 32, increasing rigidity of the vehicle in the width direction of the vehicle.

An auxiliary muffler 91 mounted in a middle portion of an exhaust line of an engine 9 extending in the longitudinal direction of the vehicle may be mounted between the first extension 61 and the second extension 62.

Furthermore, the battery mounting portion 11 of the floor panel 1 may be formed to be raised upward in the height direction of the vehicle to insert a portion of the battery 2.

The fuel tank mounting portion 12 may extend in the width direction of the vehicle to connect the left and right side members 6 and 7, and may be formed in a space formed between two connection members 33 and 34 spaced from each other in the longitudinal direction of the vehicle.

Furthermore, in front of the fuel tank mounting portion 12, the floor panel 1 may rise upward in the height direction of the vehicle to form a partition 14, and the fuel tank 3 may be mounted behind the partition 14.

Figure 5:
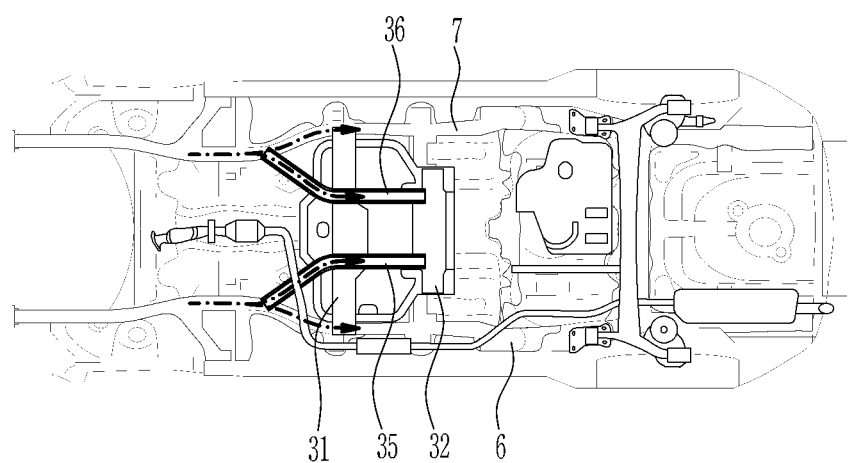
FIG. 5 is a bottom view of a vehicle body before a battery and a fuel tank are mounted on a vehicle body of a hybrid vehicle according to various exemplary embodiments of the present invention.

Meanwhile, referring to FIG. 5, a first reinforcement member 35 that connects one side member 6 and the first mounting members 31 and 32 and a second reinforcement member 36 that connects the other side member 7 and the first and second mounting members 31 and 32 may be further included.

As described above, the first and second reinforcement members 35 and 36 are further provided to increase the rigidity of the vehicle, and the first and second reinforcement members 35 and 36 form a load path for collision as shown by arrows and proper impact load dispersion can improve collision stability.

According to the structure of the battery and fuel tank disposition of the hybrid vehicle according to the exemplary embodiment of the present invention, due to expansion of the passenger compartment, it can have the same indoor marketability as a gasoline vehicle.

Furthermore, the same fuel tank and rear suspension as in a regular gasoline vehicle may be applied to a hybrid vehicle, and the steering stability may be improved by lowering the vehicle center of gravity with the lower disposal of the battery.

Front disposal of the high voltage battery can reduce weight and cost by reducing a high voltage cable length.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An arrangement structure of a battery and a fuel tank of a vehicle, in which the battery is mounted on a vehicle body at a front side of the vehicle along a longitudinal direction of the vehicle, and the fuel tank is mounted on the vehicle body at a rear side of the vehicle in the longitudinal direction of the vehicle,
   wherein a battery mounting portion and a fuel tank mounting portion that are protrudingly formed in a height direction of the vehicle to form first and second receiving spaces are provided in a floor panel of the vehicle body,
   wherein the battery is received in the first receiving space of the battery mounting portion,
   wherein the fuel tank is received in the second receiving space of the fuel tank mounting portion,
   wherein first and second side members that extend in the longitudinal direction of the vehicle are coupled to first and second sides of the floor panel in a width direction of the vehicle, and
   wherein the battery and the fuel tank are mounted in a space formed between the first and second side members,
   wherein first extensions that extend toward the outside of the vehicle in the width direction of the vehicle are provided in the first and second side members,
   wherein second extensions that extend toward the outside of the vehicle in the width direction of the vehicle are provided in the first and second side members at a position which is rear than the first extension portion in the longitudinal direction of the vehicle, and
   wherein the battery is mounted in a space formed between the first extensions and the second extensions and is mounted on the floor panel through first and second mounting members overlapped to the battery.

2. The arrangement structure of the battery and the fuel tank of the vehicle of claim 1,
   wherein the battery is mounted below a front seat of the vehicle at the front side in the longitudinal direction of the vehicle, and
   wherein the fuel tank is mounted below a rear seat of the vehicle at the rear side in the longitudinal direction of the vehicle.

3. The arrangement structure of the battery and the fuel tank of the vehicle of claim 1,
   wherein a tunnel portion is protrudingly formed upward in the height direction of the vehicle in the floor panel, and
   wherein the battery and the fuel tank are mounted to be horizontally symmetrically about the tunnel portion.

4. The arrangement structure of the battery and the fuel tank of the vehicle of claim 1, wherein the first extensions and the second extensions form a closed cross-sectional surface with the floor panel.

5. The arrangement structure of the battery and the fuel tank of the vehicle of claim 1, wherein a front seat of the vehicle is engaged to the floor panel through a seat mounting member, and wherein the seat mounting member, the first mounting member, and the second mounting member are in parallel with each other in the width direction of the vehicle, and are overlapped with each other in the height direction of the vehicle.

6. The arrangement structure of the battery and the fuel tank of the vehicle of claim 1, wherein an auxiliary muffler mounted in a middle portion of an exhaust line of an engine extending in the longitudinal direction of the vehicle is mounted between the first extensions and the second extensions.

7. The arrangement structure of the battery and the fuel tank of the vehicle of claim 1, wherein the fuel tank mounting portion is disposed to extend in the width direction of the vehicle to connect the first and second side members, and is formed in a space formed between at least two connection members spaced from each other in the longitudinal direction of the vehicle.

8. The arrangement structure of the battery and the fuel tank of the vehicle of claim 7, wherein the floor panel is formed to rise in a predetermined length in the height direction of the vehicle to form a partition in a front of the fuel tank mounting portion, and the fuel tank is mounted behind the partition.

9. The arrangement structure of the battery and the fuel tank of the vehicle of claim 7, further including a reinforcement member that connects the first and second side members and at least one of the first and second mounting members.

10. The arrangement structure of the battery and the fuel tank of the vehicle of claim 9, wherein the reinforcement member includes a first reinforcement member that connects the first side member and at least one of the first and second mounting members.

11. The arrangement structure of the battery and the fuel tank of the vehicle of claim 10, wherein the reinforcement member includes a second reinforcement member that connects the second side member and at least one of the first and second mounting members.

* * * * *